US006931465B1

(12) United States Patent  (10) Patent No.: US 6,931,465 B1
Cordner  (45) Date of Patent: Aug. 16, 2005

(54) INTELLIGENT, EXTENSIBLE SIE PERIPHERAL DEVICE

(75) Inventor: Scott Cordner, Vista, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 435 days.

(21) Appl. No.: 09/823,414

(22) Filed: Mar. 31, 2001

(51) Int. Cl.[7] ............................................. G06F 13/12
(52) U.S. Cl. .............................. 710/63; 710/16; 710/72
(58) Field of Search .............................. 710/72, 73, 62, 710/63, 64, 8, 9, 10, 16

(56) References Cited

U.S. PATENT DOCUMENTS

| | | | |
|---|---|---|---|
| 4,689,740 A | 8/1987 | Moelands et al. | |
| 5,559,502 A | 9/1996 | Schutte | |
| 5,689,196 A | 11/1997 | Schutte | |
| 5,974,486 A | 10/1999 | Siddappa | |
| 6,012,103 A | 1/2000 | Sartore et al. | |
| 6,145,045 A | 11/2000 | Falik et al. | |
| 6,148,354 A | 11/2000 | Ban et al. | |
| 6,173,355 B1 | 1/2001 | Falik et al. | |
| 6,370,603 B1 * | 4/2002 | Silverman et al. | 710/72 |
| 6,389,495 B1 * | 5/2002 | Larky et al. | 710/8 |
| 6,629,169 B2 * | 9/2003 | Chu | 710/72 |

FOREIGN PATENT DOCUMENTS

| WO | WO96 /17305 | 6/1996 |
|---|---|---|
| WO | WO98 /34376 | 8/1998 |
| WO | WO99 /09712 | 2/1999 |

OTHER PUBLICATIONS

Larky, Steven P. , et al., "Dedicated Circuit and Method for Enumerating and Operating a Peripheral Device on a Universal Serial Bus (USB)", U.S. Appl. No. 09/232,578, filed Jan. 16, 1999.
"Cypress Intelligent Serial Interface Engine Provides USB 2.0 Connectivity to Embedded Microcontrollers", Cypress Press Release, Mar. 17, 2001, pp. 1-2.
"ISP1581 Universal Serial Bus 2.0 High-Speed Interface Device", Oct. 23, 2000, Rev. 02, pp. 1-73.
"CY7C68001 EZ-USB SX2 High-Speed USB Interface Device", Jan. 4, 2001, pp. 1-29.
"Universal Serial Bus Specification", Revision 1.1, Sep. 23, 1998, pp. 1-311.
"Universal Serial Bus Specification", Revision 2.0, Apr. 27, 2000, pp. 1-622.

* cited by examiner

*Primary Examiner*—Khanh Dang
(74) *Attorney, Agent, or Firm*—Christopher P. Maiorana, PC

(57) ABSTRACT

An apparatus for coupling a peripheral device to a host comprising an interface circuit and a logic circuit. The interface circuit may be configured to (i) receive a request from the host and (ii) present a response to the host. The logic circuit may be configured to (i) generate the response when the request is serviceable by the apparatus or (ii) pass the request to an external circuit when the request is not serviceable by the apparatus.

20 Claims, 4 Drawing Sheets

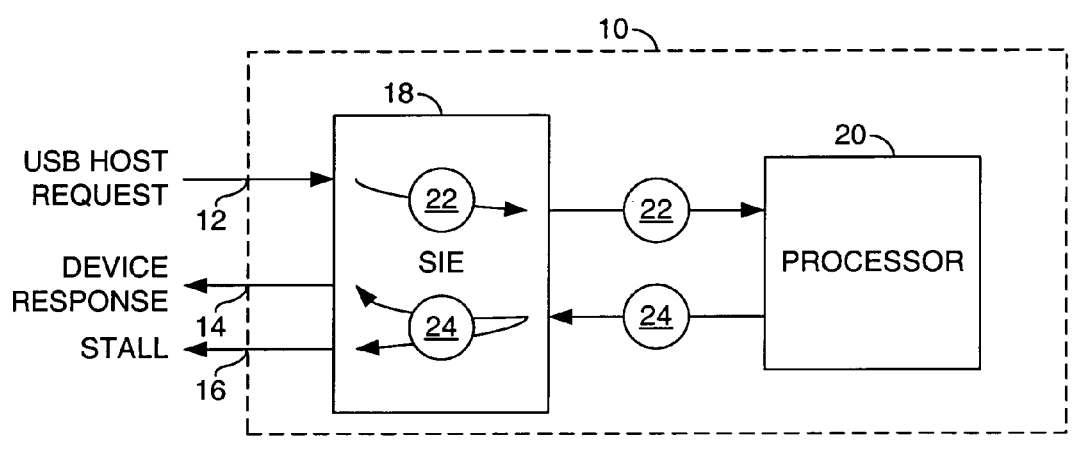
(CONVENTIONAL)
FIG. 1

US 6,931,465 B1

INTELLIGENT, EXTENSIBLE SIE PERIPHERAL DEVICE

FIELD OF THE INVENTION

The present invention relates to a method and/or architecture for interfacing peripheral devices to a host generally and, more particularly, to a method and/or architecture for intelligent, extensible serial interface engines (SIE) within peripheral devices.

BACKGROUND OF THE INVENTION

Some systems that connect to the Universal Serial Bus (USB) can include "intelligence" (e.g., DSP, Microprocessor, or ASIC). Systems that contain intelligence can use a USB serial interface engine (SIE) to interface with the USB. The conventional USB SIE is dumb (e.g., a physical layer and a FIFO). The conventional USB SIE acts as a conduit, passing (i) USB requests and data from a host to an outside intelligence and (ii) responses from the outside intelligence to the host.

Referring to FIG. 1, a block diagram of a conventional peripheral device 10 is shown. The device 10 has an input 12 that receives requests from a USB host (not shown), an output 14 that presents responses from the device to the host for recognized requests, and an output 16 that presents a stall signal when the device does not recognize the host request. The peripheral device 10 includes a serial interface engine (SIE) 18 and an external processor 20. The processor 2b can be a digital signal processor (DSP), a microprocessor ($\mu$P), an application specific integrated circuit (ASIC), or other type of external processor. The SIE 18 relays all USB requests (e.g., the circles 22) to the processor 20 and all responses (e.g., the circles 24) from the processor 20 to the host.

Since the conventional SIEs act only as a conduit, the external processor 20 must handle all USB overhead traffic, which reduces performance.

SUMMARY OF THE INVENTION

The present invention concerns an apparatus for coupling a peripheral device to a host comprising an interface circuit and a logic circuit. The interface circuit may be configured to (i) receive a request from the host and (ii) present a response to the host. The logic circuit may be configured to (i) generate the response when the request is serviceable by the apparatus or (ii) pass the request to an external circuit when the request is not serviceable by the apparatus.

The objects, features and advantages of the present invention include providing a method and/or architecture for intelligent, extensible serial interface engines within peripheral devices that may (i) simplify the outside intelligence and firmware; (ii) allow external processor to concentrate on function instead of low level USB protocols; (iii) provide improved performance; (iv) eliminate time consumed communicating between SIE and external processor for low level protocol response; (v) be extensible by allowing external processor to handle: class requests, vendor requests, custom driver requests, USB specification changes and enhancements, (vi) allow peripheral designers to add USB capability to products without having to learn USB protocols, and/or (vii) speed up time to market for peripheral designs.

BRIEF DESCRIPTION OF THE DRAWINGS

These and other objects, features and advantages of the present invention will be apparent from the following detailed description and the appended claims and drawings in which:

FIG. 1 is a block diagram illustrating a conventional serial interface engine;

DETAILED DESCRIPTION OF THE PREFERRED EMBODIMENTS

Figure 2:
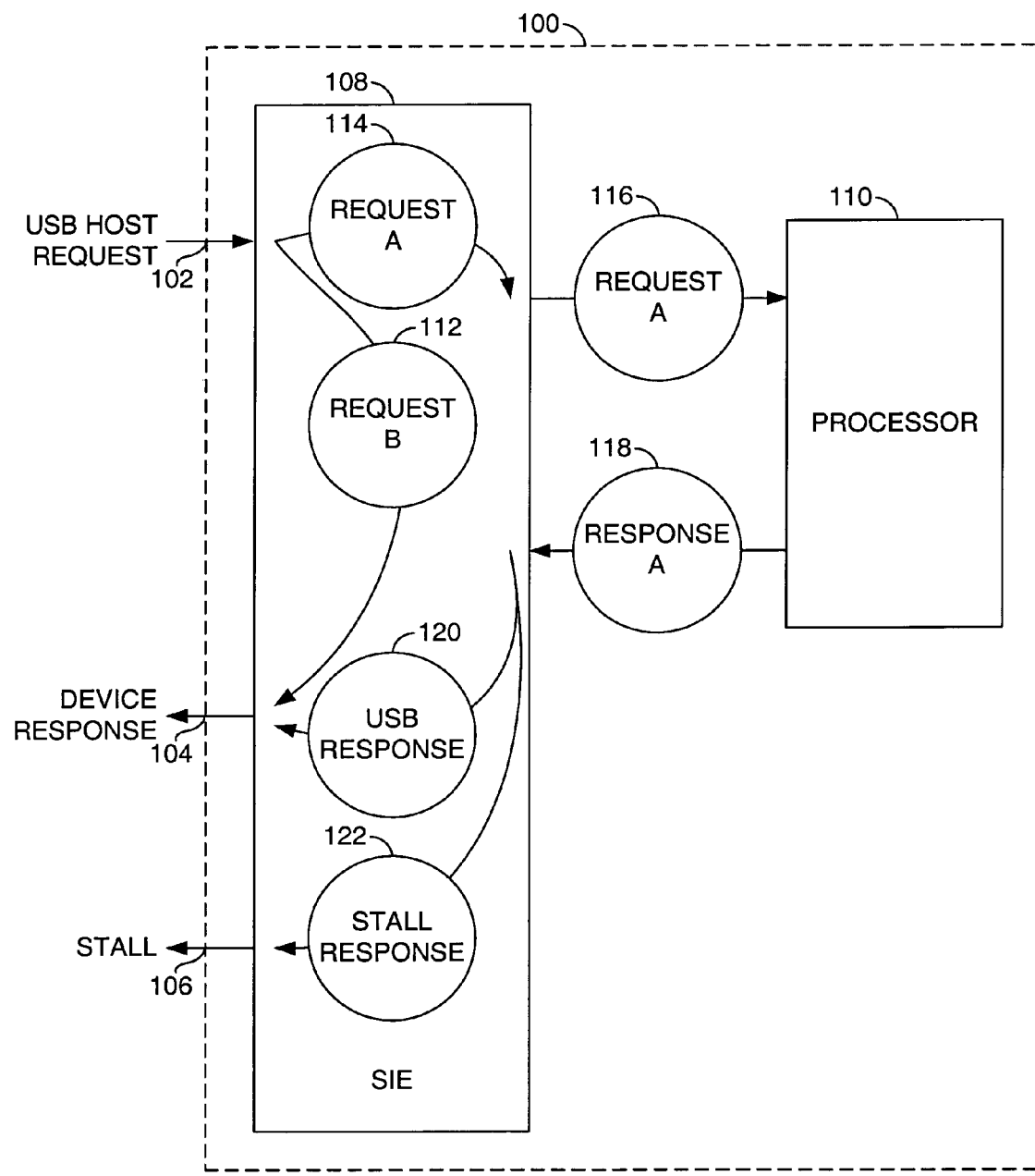
FIG. 2 is a block diagram illustrating a preferred embodiment of the present invention.

Referring to FIG. 2, a block diagram of a peripheral device 100 implemented in accordance with a preferred embodiment of the present invention is shown. The device 100 may be connected to a host device (not shown). The device 100 may be implemented as a USB peripheral device that may be compliant with the USB specification version 1.0 (published November 1996), the USB specification version 1.1 (published September 1998), and/or the USB specification version 2.0 (published April 2000), each of which is hereby incorporated by reference in their entirety. The device 100 may have an input 102 that may receive a request from the host device (e.g., a USB_HOST_REQUEST), an output 104 may present a response (e.g., DEVICE_RESPONSE) to the host, and an output 106 may present a signal (e.g., STALL). The signal STALL may indicate that the device 100 did not recognize the request USB_HOST_REQUEST.

The device 100 may comprise a circuit (block) 108 and a circuit (block) 110. The circuit 108 may be implemented as an enhanced serial interface engine (SIE). The circuit 110 may be implemented as any of a number of processor circuits. For example, the circuit 110 may be implemented as a digital signal processor (DSP), a microprocessor ($\mu$P), an application specific integrated circuit (ASIC), or any other processor or controller circuit. The circuit 110 is generally implemented externally to the circuit 108. However, the circuit 108 and the circuit 110 may be mounted on a common circuit board and/or enclosed in a single package.

The circuit 108 may be configured to automatically handle basic protocol requests that would conventionally be handled by an external intelligence (e.g., the processor 110). In one example, the circuit 108 may be configured to handle USB protocol messaging as described in Chapter 9 of the USB 2.0 Specification, which is hereby incorporated by reference in its entirety. For example, the circuit 108 may be configured to automatically respond to enumeration requests using descriptor tables received from the circuit 110. The circuit 108 may be further configured to pass USB host requests to the circuit 110 and to pass responses from the circuit 110 to the host when the circuit 108 is unable to handle the request.

The circuit 108 may be configured to handle the physical layer requirements for USB 2.0 and 1.1, the packet protocol layer, and maintain one or more USB endpoints (e.g., control endpoints and data endpoints). The circuit 108 may be configured to store descriptor information presented by the external processor 110 before enumeration. The circuit 108 may be configured to communicate completion of an enumeration process to the external processor 110 via an interrupt signal. The circuit 108 may be configured to communicate to the external processor using an interrupt that a basic protocol request has been automatically handled. The circuit 108 may be configured to handle USB Chapter 9 protocol communications transparently to the external processor 110.

The circuit 108 may be configured to automatically handle basic USB requests (e.g., enumeration). The circuit 108 may be configured to determine whether the signal USB_HOST_REQUEST is a request of a first type (e.g., a basic request) that may be handled (is serviceable) by the circuit 108 or a request of a second type (e.g., class request) that is generally passed to the circuit 110 (e.g., not serviceable by the circuit 108). The circuit 108 may be configured to generate the signal DEVICE_RESPONSE when the request USB_HOST_REQUEST is of the first type (e.g., request B in the circle 112). When the signal USB_HOST_REQUEST is of the second type (e.g, request A), the circuit 108 generally passes the request to the circuit 110 (e.g., the circles 114 and 116). In general, only requests that are unrecognized by the circuit 108 are passed to the external processor 110.

The external processor 110 generally handles only custom requests, that is, requests not recognized by the circuit 108. The circuit 110 may be configured to generate a response to the requests received from the circuit 108. For example, the circuit 110 may be configured to execute a number of instructions (e.g., software/firmware) in response to the requests. The responses generated by the circuit 110 may be presented to the circuit 108 (e.g., the circle 118). The response generated by the circuit 110 may comprise, for example, a USB response (e.g., the circle 120) or a stall response (e.g., the circle 122). The circuit 108 generally presents the response received from the circuit 110 to the host.

The external processor 110 may be configured to pre-load the circuit 108 with descriptor tables that may be required for enumeration. The circuit 108 may be configured, in one example, to automatically respond to all host enumeration requests (e.g., the circle 112). The circuit 108 may be configured to pass all unrecognized requests (e.g., requests that are unserviceable by the circuit 108) to the external processor 110. For example, the external processor 110 may be configured to respond to standard class device requests (e.g., as defined in the Class Device Definitions for Human Interface Devices (HID) specification, revision 1.1, dated Apr. 7, 1999, which is hereby incorporated by reference in its entirety), vendor specific requests, and/or custom device requests. The external processor 110 may be configured to respond with either a USB response or a STALL when the request is not recognized.

The present invention may enhance the functionality of an SIE peripheral device by increasing performance while reducing the need for external processor intervention and overhead. The present invention may provide USB compatibility with less firmware and fewer external processor cycles.

Figure 3:
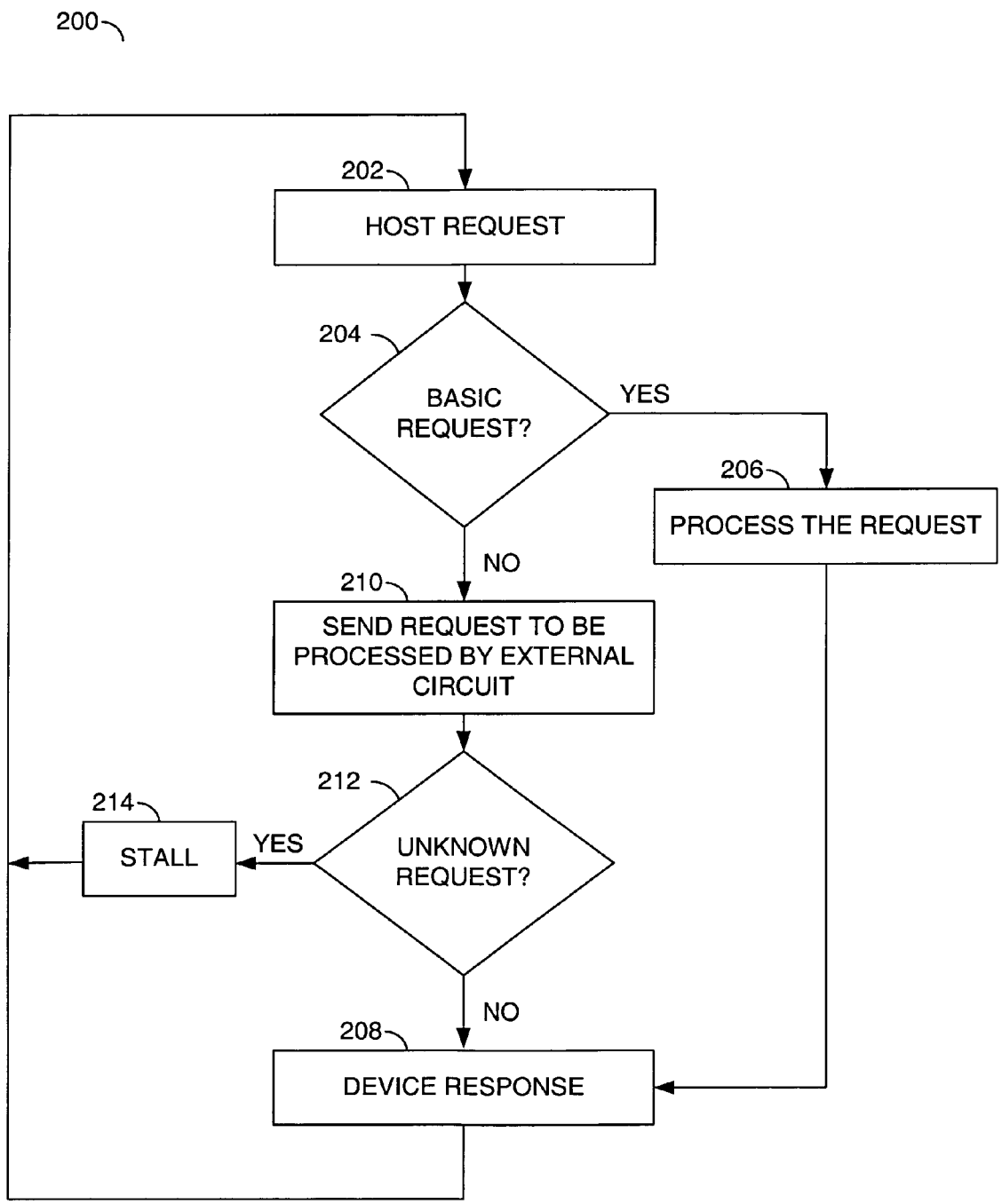
FIG. 3 is a flow chart illustrating an example operation of the present invention.

Referring to FIG. 3, a flow diagram illustrating an example operation in accordance with a preferred embodiment of the present invention is shown. The circuit 108 may be configured to accept host requests (e.g., the block 202). The circuit 108 may determine whether the host request is a basic request (e.g., a Chapter 9 request) that can be handled internally (e.g., the "Yes" arrow from the block 204) or an unrecognizable request that must be passed on to the external processor 110 (e.g., the "No" arrow from the block 204). When the host request is a basic request that may be handled internally, the circuit 108 may be configured to process the request (e.g., the block 206), and present the response to the host (e.g., the block 208).

When the request is unrecognized by the circuit 108, the request may be passed on to the external processor (e.g., the block 210). The processor 110 may be configured, in one example, via firmware, to handle requests passed on from the circuit 108. The processor 110 may check the request to determine whether the request is recognized or not. When the request is recognized, the processor 110 may be configured to issue a response to the circuit 108 (e.g., the "No" arrow from the block 212). The circuit 108 may be configured to pass the response from the external processor 110 onto the host (e.g., the block 208). When the request received from the host is an unknown request, the processor 110 may be configured to issue a stall response (e.g., the block 214).

The external processor 110 may load all descriptor information tables needed for enumeration into the circuit 108 before enumeration. The circuit 108 may be configured to automatically respond to all recognized USB requests from the host. When a request is received that the circuit 108 does not recognize, the circuit 108 may be configured to pass the unrecognized request (e.g., class and vendor specific requests) to the external processor 110. The external processor 110 may be configured (e.g., through firmware) to respond to the request or stall the request.

Figure 4:
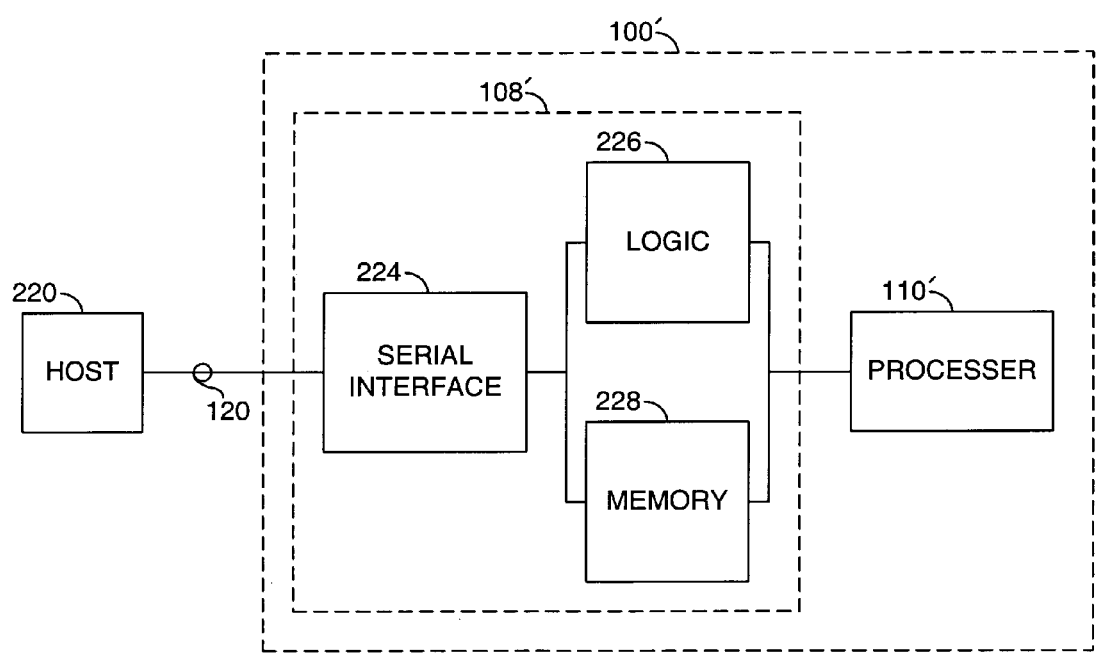
FIG. 4 is a block diagram illustrating an example implementation of a preferred embodiment of the present invention.

Referring to FIG. 4, a block diagram of a circuit 100' illustrating an example implementation of a preferred embodiment of the present invention is shown. The circuit 100' may be implemented similarly to the circuit 100. The circuit 100' may comprise an interface circuit 108' and a processor circuit 110'. The circuit 100' may be coupled to a host 220, in one example, via a serial bus 222. The serial bus 222 may be implemented, in one example, in accordance with the USB 2.0 specification. The circuit 108' may comprise a serial interface engine (or block) 224, a logic circuit (block) 226, and a memory 228. The logic block 226 may be configured to handle some host requests. The memory 228 may be configured to store information for handling the host requests. The logic circuit 226 and the memory 228 may be interfaced to the external processor 110'. The processor 110' may be configured to load information (e.g., descriptor tables) into the memory 228.

The present invention may simplify the outside intelligence of a USB peripheral device. The external processor 110 may concentrate on function instead of low level USB protocols. The present invention may provide higher performance. For example, the present invention may eliminate time consumed communicating between the circuit 108 and the external processor 110 for low level protocol responses. In one example, the present invention may provide an enhanced serial interface engine that is extensible. For example, provision may be made to allow the external processor 110 to handle class requests, vendor requests, custom driver requests, USB specification changes and/or other enhancements.

The present invention may be implemented in firmware or logic. The present invention may provide for the addition of intelligence to an SIE only peripheral chip. Historically, SIE only peripherals have been dumb devices with no provision to automatically respond to USB requests. The present invention may add intelligence to SIEs without adding significant cost or taking away from the functionality desired from an SIE. The present invention may allow USB system designers to gain increased performance with less code.

The function performed by the flow diagram of FIG. 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus for coupling a peripheral device to a host comprising:
   an interface circuit configured to receive a request from said host and present a response to said request to said host; and
   a serial interface engine (SIE) coupled to said interface circuit and configured to (i) automatically generate said response to said request when said request is a first type of request that said serial interface engine is configured to recognize and (ii) pass (a) said request from said interface circuit to an external circuit and (b) said response to said request from said external circuit to said interface circuit when said request is a second type of request that said serial interface engine is not configured to recognize.

2. The apparatus according to claim 1, wherein said interface circuit comprises a serial interface.

3. The apparatus according to claim 1, wherein said external circuit comprises a processor.

4. The apparatus according to claim 3, wherein said external circuit comprises a processor selected from the group consisting of a digital signal processor (DSP), a microprocessor, and an application specific integrated circuit (ASIC).

5. The apparatus according to claim 1, wherein said apparatus comprises a universal serial bus (USB) peripheral device.

6. The apparatus according to claim 1, wherein said serial interface engine is configured to generate said response to said first type of request using information received from said external circuit.

7. The apparatus according to claim 6, wherein said serial interface engine further comprises a memory configured to store said information and said information comprises a descriptor table.

8. The apparatus according to claim 1, wherein said serial interface engine is further configured to (i) automatically service an enumeration request, (ii) to handle physical layer requirements, (iii) to handle a packet protocol layer, and (iv) to maintain one or more endpoints.

9. The apparatus according to claim 1, wherein said serial interface engine is further configured to handle USB chapter 9 protocol communications transparently to said external circuit and said first type of request comprises a request as defined in Chapter 9 of the Universal Serial Bus (USB) Specification, revision 2.0.

10. The apparatus according to claim 1, wherein said second type of request comprises a request selected from the group consisting of a class request, a vendor request, a custom driver request, and requests implemented to support USB specification changes and enhancements.

11. The apparatus according to claim 1, wherein said external circuit is configured to generate a stall signal as said response when said request of said second type is not recognized by said external circuit.

12. An apparatus comprising:
    means for receiving a request from a host and presenting a response to said request to said host;
    means for generating said response automatically when said request is of a first type recognized by said generating means; and
    means for passing (i) said request from said receiving and presenting means to an external circuit and (ii) said response from said external circuit to said receiving and presenting means when said request is of a second type not recognized by said generating means.

13. A method for interfacing a peripheral device to a host comprising the steps of:
    receiving a request from said host;
    automatically responding to said request within a serial interface engine when said request is a first type of request that said serial interface engine is configured to recognize;
    when said request is a second type of request that said serial interface engine is not configured to recognize, passing said request to an external circuit;
    receiving a response to said request from said external circuit when said request is of said second type; and
    passing on said response to said host.

14. The method according to claim 13, further comprising the step of:
    generating said response as a stall command when said request is not recognized by said external circuit.

15. The method according to claim 13, wherein said external circuit comprises a processor selected from the group consisting of a digital signal processor (DSP), a microprocessor, and an application specific integrated circuit (ASIC).

16. The method according to claim 13, wherein said requests are received via a serial bus in accordance with the Universal Serial Bus (USB) Specification, revision 1.0, 1.1, or 2.0.

17. The method according to claim 13, wherein said first type of request comprises an enumeration request.

18. The method according to claim 13, wherein said second type of request presented to said external circuit comprises a request selected from the group consisting of a class request, a vendor request, a custom driver request, and a request implemented to support changes and/or enhancements to a communication protocol.

19. The method according to claim 17, wherein the step of automatically responding to said request comprises enumerating said peripheral device without passing said enumeration request to said external circuit.

20. The method according to claim 13, further comprising the step of receiving one or more descriptor tables from said external circuit.

* * * * *